Nov. 7, 1950   R. A. LAWRENCE   2,528,890
SNOW TRACTOR
Filed Oct. 22, 1947   2 Sheets-Sheet 1
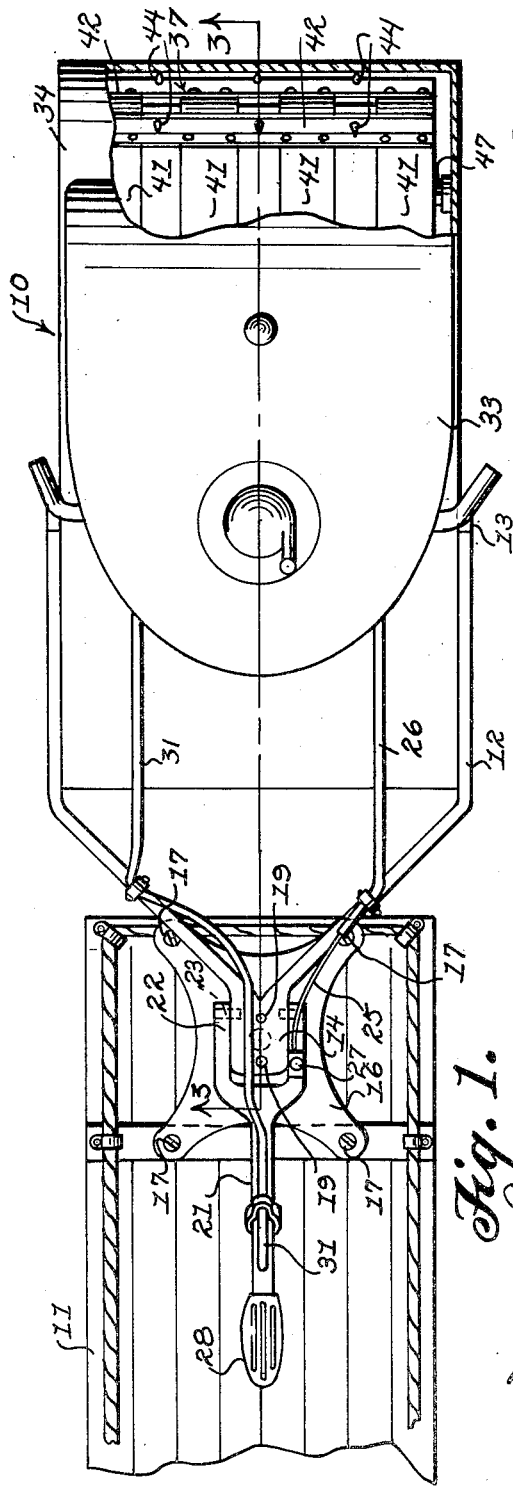
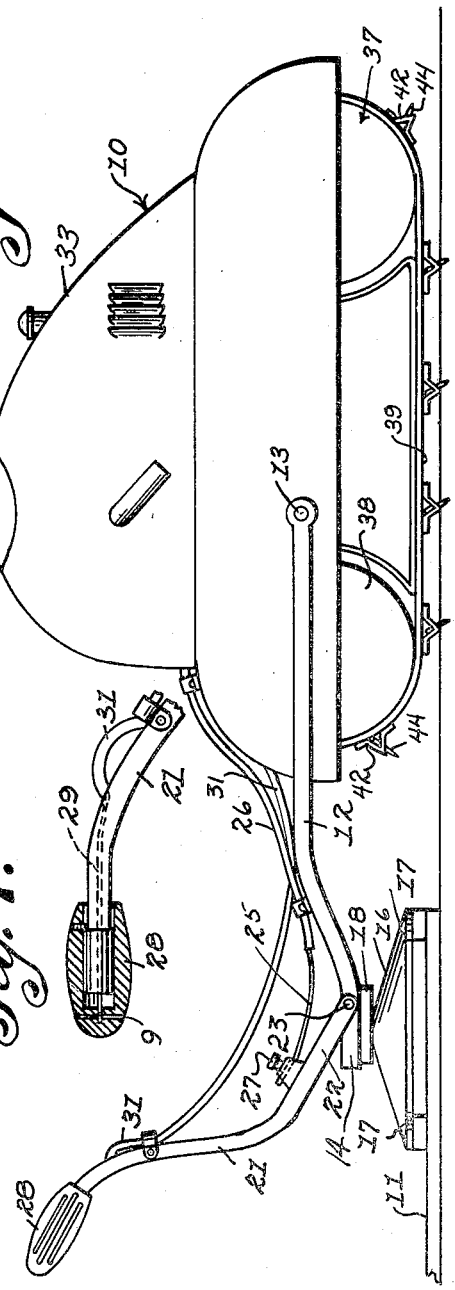
INVENTOR.
Robert A. Lawrence
BY Victor J. Evans & Co.
ATTORNEYS

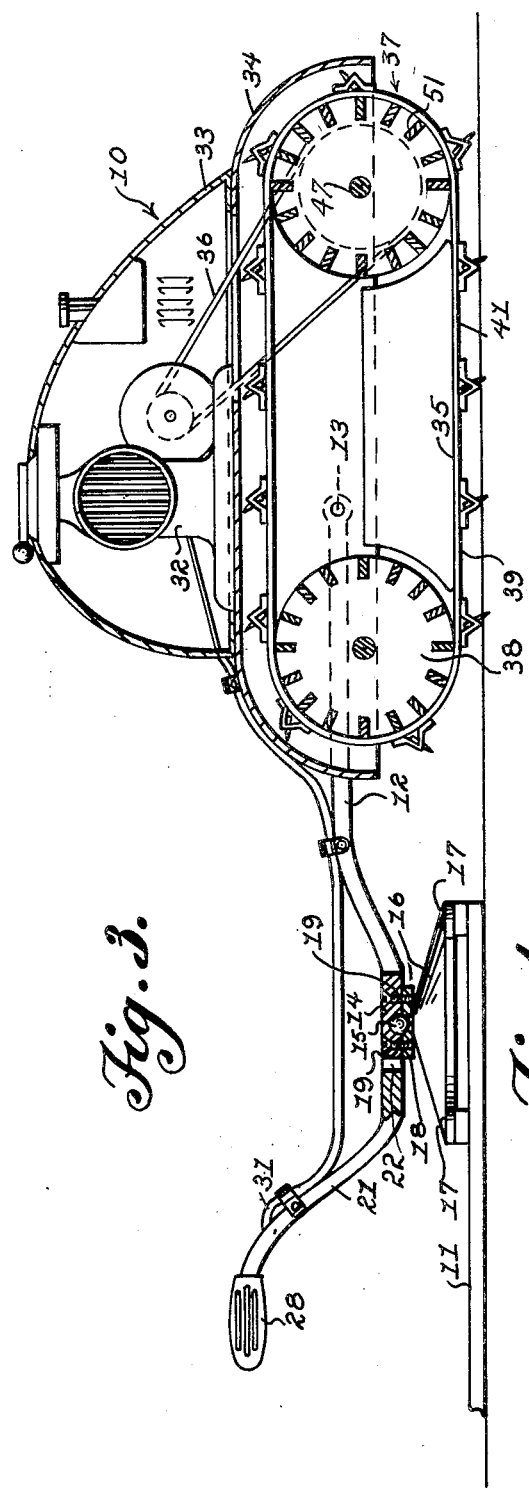

Patented Nov. 7, 1950

2,528,890

UNITED STATES PATENT OFFICE 2,528,890

SNOW TRACTOR

Robert A. Lawrence, Brimley, Mich.

Application October 22, 1947, Serial No. 781,445

1 Claim. (Cl. 180—5)

This invention relates to a mobile power unit for propelling toboggans and sleds over snow and ice.

It is an object of the present invention to provide a power propelling unit operable in the same manner as outboard motors for boats but upon the land to push the conveyance and thus in its connection with the conveyance provide for the steering of the same.

Other objects of the present invention are to provide a mobile power unit of the pusher type which is simple to operate and control from the conveyance to which it is connected, which is of simple construction, easy to attach to the conveyance and efficient in operation.

For a better understanding of the invention, reference may be had to the following detailed description taken in connection with the accompanying drawing, in which Fig. 1 is a top plan view of the mobile power unit attached to the rear of a toboggan and embodying the features of the present invention, Fig. 2 is a side elevational view of the unit, Fig. 3 is a longitudinal cross-sectional view of the unit taken generally on line 3—3 of Fig. 1, Fig. 4 is an enlarged fragmentary sectional view taken through the unit tracks, Fig. 5 is a side elevational view of one of the pins used on the tracks, Fig. 6 is a perspective view of one of the unit drums between which the crawler tracks are extended, Fig. 7 is an enlarged cross-sectional view taken through the control handle.

Referring now to the figures, 10 represents my mobile power unit adapted to be attached to a toboggan 11. My unit 10 has a forwardly extending push structure 12 having its sides hinged to the side of the unit as indicated at 13 for vertical adjustment. The structure 12 has a plate portion 14 for receiving a ball projection 15 of the upper end of a conical plate 16 which is attached at four corners to the toboggan 11 by screws 17. A clamping plate 18 is disposed about the bottom of the ball and is fastened to the plate portion 14 by screws 19. A universal ball and socket connection is accordingly effected between the adjustable push structure 12 and the conical plate 16. A steering handle 21 is connected through a bifurcated portion 22 thereof to the plate portion 14 of the push structure 12 and extends forwardly to be accessible to the rider so that he may cause a steering action to be effected between the unit 10 and the toboggan 11. The connection of the bifurcated portion 22 with the portion 14 is effected by hinge pins 23 so that the handle 21 can be moved up and down. The handle 21 is connected by a wire 25 to the unit 10 whereby to effect the operation of the unit's clutch. This wire will be extended through a sleeve 26 on the structure 12 and which enters the unit with the wire 25. The connection of the handle and the wire 25 is effected by a set screw 27.

On the upper end of the handle is a grip 28 which can be adjusted to effect the movement of a throttle wire 29 extending through a tube 31 and to a unit power plant 32. Through this grip and wire 29 the speed of the unit is controlled. This throttle control is conventional and is accomplished by actuation of a handle grip 28 which is slidably mounted on the handle 21 for suitable push-pull action. A pin 9 is embedded in the handle grip 28 for anchoring the throttle line 29.

The unit 10 comprises a casing 33 in which the power plant 32 is housed. This casing is stream lined to have a pleasing appearance and includes an apron portion 34 extending downwardly over a propelling rig 35. This rig is driven by a pulley belt or chain 36 which connects with a driving drum 37. At the opposite end of the rig is an idler drum 38 and between these drums there is extended a driving track 39 comprising a continuous flat and flexible member 41, Fig. 4, extending over the drums and having plates or cleats 42 of V-section connected to the flexible member 41 by rivets 43. These plates 42 have pins 44 connected by a bolt 45 to the interior of the plate and projecting outwardly along one side of the V to have engagement with the ice or ground over which the unit is being propelled. The pins 44 have an eye portion 46 for receiving the bolts 45.

Each of the drums, Fig. 6, are formed with a shaft 47, end plates 48 and 49 and slats 51 extending between the plates 48 and 49 at circumferentially spaced locations thereabout.

While illustration has been made of the connection of my unit to a toboggan it will be understood that the same can be connected to a sled or other conveyance. The unit can be also used as a small garden tractor. The clutch is conventional and is arranged within the casing 33. The clutch is adapted to be actuated by raising or lowering of the steering arm 21 which is connected at 27 to a flexible cable 25, the cable 25 in turn being connected to a conventional clutch release arm mounted within the casing.

The operator faces the direction of travel and steers from behind him, as in an outboard motor boat. The power unit 10 is used to push the toboggan, the power unit being coupled behind the toboggan. The cleat pins 44 are inclined so that added traction on soft surfaces or icy surfaces is provided, since this added traction could not be accomplished by cleats which are not inclined.

While various changes may be made in the detail construction, it shall be understood that such changes shall be within the spirit and scope of the present invention as defined by the appended claim.

I claim:

In combination, a casing, a propelling track supported by the casing for engagement with the ground, a power plant in said casing for operating said propelling track, said power plant having a clutch and a throttle, a push structure hinged to said casing, a plate portion at the end of said push structure and having a socket, a toboggan, a plate member secured to the rear of said toboggan, a ball-like projection extending upwardly from said plate member and anchored within said socket, a steering handle for steering said toboggan over the ground, said steering handle extending in the direction of and overlying said toboggan and having a bifurcated end fitting about said plate portion, hinge means pivoting said steering handle to said plate portion for movement in a plane substantially vertical to said toboggan, a flexible clutch actuating cable connected to said steering handle, a hand grip slidably mounted on an end of said steering handle, and a flexible throttle actuating cable connected to said hand grip.

ROBERT A. LAWRENCE.

REFERENCES CITED

The following references are of record in the file of this patent:

UNITED STATES PATENTS

| Number | Name | Date |
|---|---|---|
| 1,353,318 | Cowan | Sept. 21, 1920 |
| 1,530,223 | Young | Mar. 17, 1925 |
| 1,602,735 | Wolfe | Oct. 12, 1926 |
| 2,253,288 | De Lucchi | Aug. 19, 1941 |
| 2,289,768 | Fehrenbacher | July 14, 1942 |
| 2,392,063 | Reimann et al. | Jan. 1, 1946 |
| 2,440,518 | Lewis et al. | Apr. 27, 1948 |

FOREIGN PATENTS

| Number | Country | Date |
|---|---|---|
| 118,365 | Switzerland | Jan. 3, 1927 |